Aug. 20, 1968  H. R. SHAFFER  3,398,325
SOLID-STATE OVERLOAD PROTECTION CIRCUIT
Filed Sept. 17, 1965  4 Sheets-Sheet 1
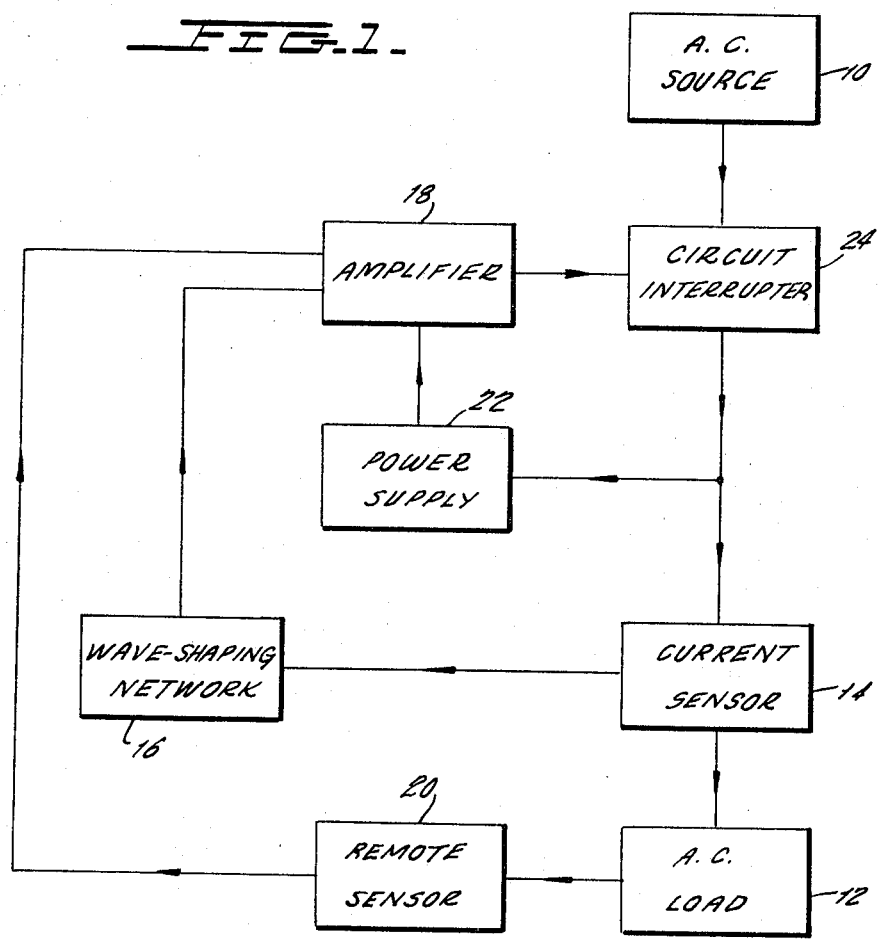
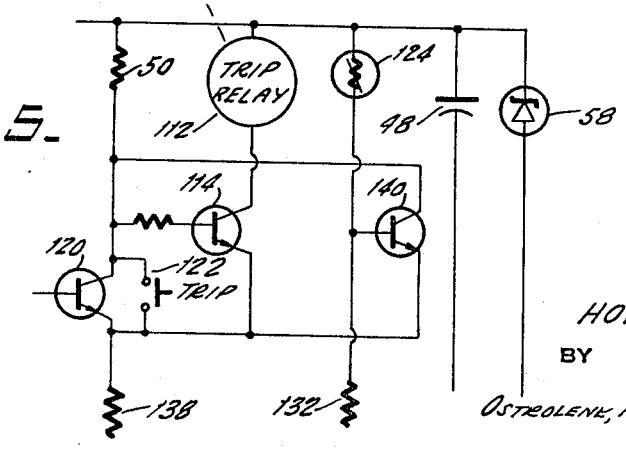
INVENTOR
HOWARD R. SHAFFER
BY
OSTROLENK, FABER, GERB & SOFFEN
ATTORNEYS Aug. 20, 1968     H. R. SHAFFER     3,398,325
SOLID-STATE OVERLOAD PROTECTION CIRCUIT
Filed Sept. 17, 1965     4 Sheets-Sheet 2
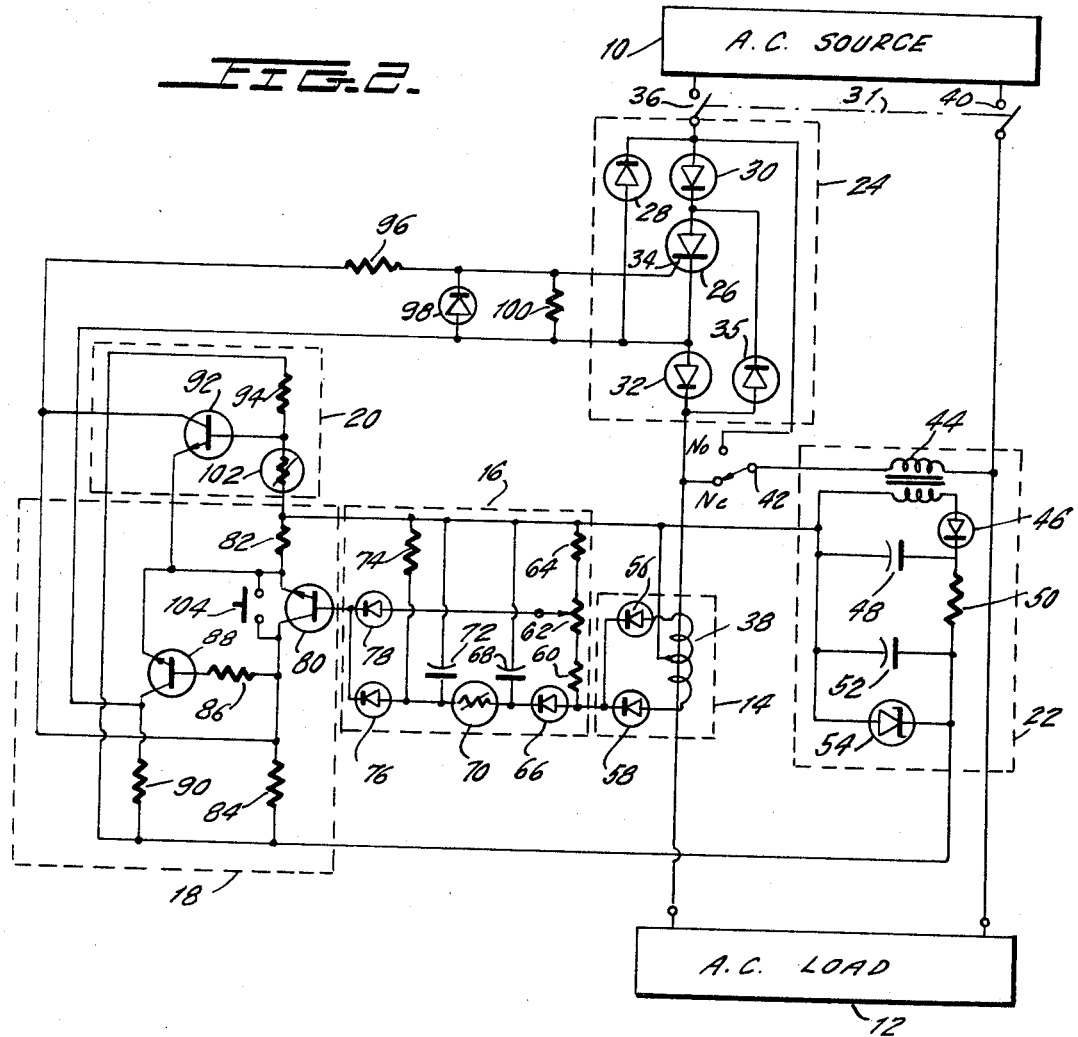
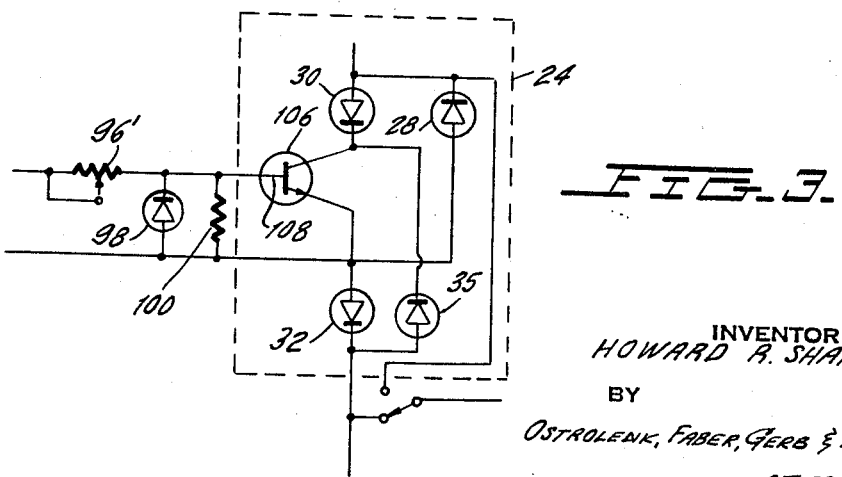
INVENTOR
HOWARD R. SHAFFER
BY
OSTROLENK, FABER, GERB & SOFFEN
ATTORNEYS

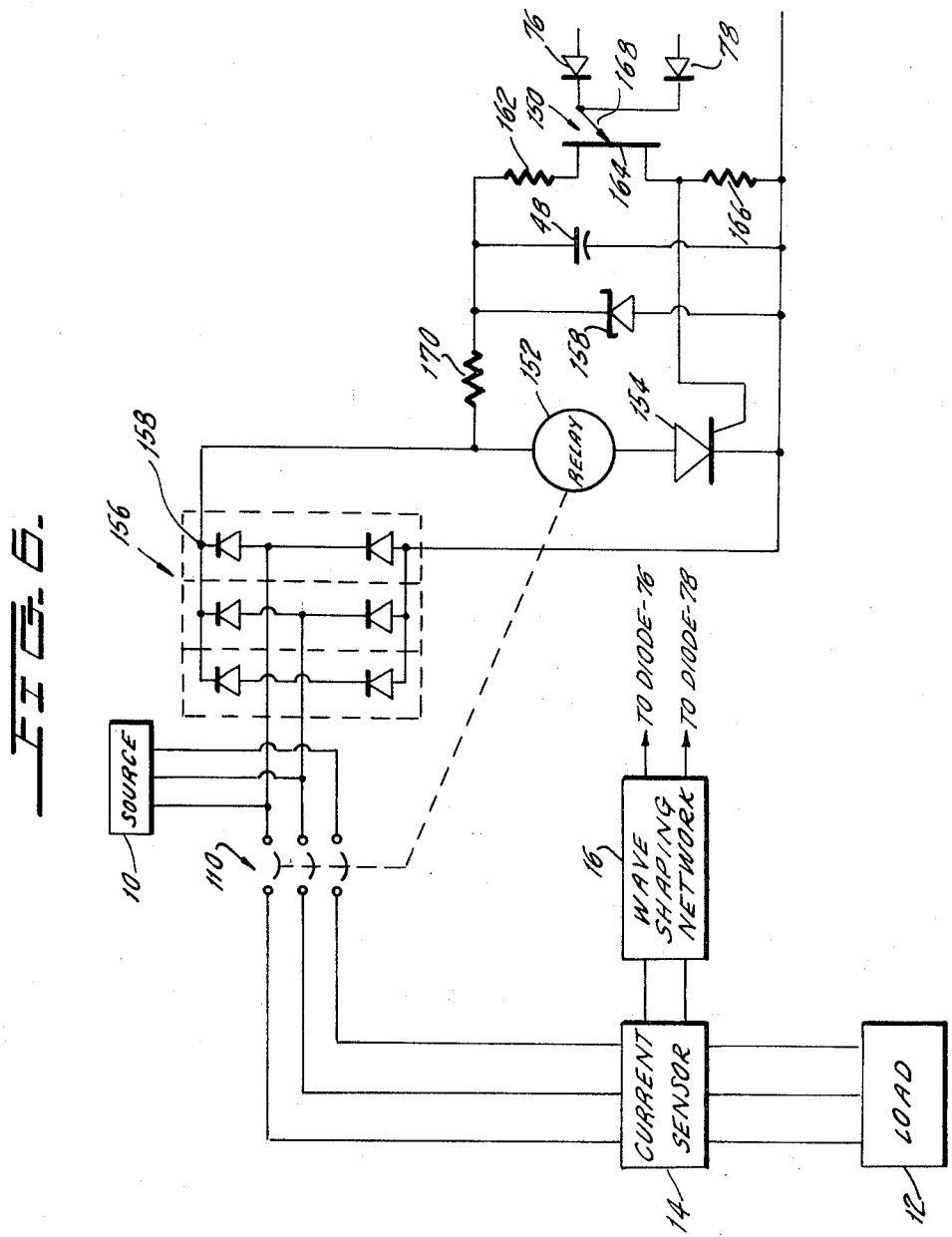

United States Patent Office 3,398,325
Patented Aug. 20, 1968

3,398,325
SOLID-STATE OVERLOAD PROTECTION CIRCUIT
Howard R. Shaffer, Glenside, Pa., assignor to I-T-E Circuit Breaker Company, Philadelphia, Pa., a corporation of Pennsylvania
Filed Sept. 17, 1965, Ser. No. 488,063
17 Claims. (Cl. 317—31)

ABSTRACT OF THE DISCLOSURE

An overload protection circuit is disclosed having a wave shaping network connected to an electronic tripping network. The wave shaping network is responsive to current flow in a circuit to be protected for producing voltages representative of the instantaneous current in such circuit and a time delay value of such current. The electronic tripping network is responsive to predetermined values of these voltages to interrupt the circuit to be protected.

---

This invention relates to a circuit breaker overload protection circuit, and more particularly to a solid-state circuit arrangement responsive to predetermined overload conditions to electrically trip the circuit breaker in a manner which eliminates mechanical arrangements prevalent in the prior art; permits increased adjustability; and increases reliability of operation.

It is well known in the circuit breaker art to trip a breaker upon the occurrence of a moderate overload condition existing for a prolonged duration, with such operation usually being provided by the deflection of a bimetallic element responsive to the thermal condition resulting from moderate overload. The deflection of the bi-metallic element is calibrated to provide the desired tripping time characteristics according to the time duration of the particular overload condition. Such deflection is mechanically interconnected to a latch arrangement for operating the circuit breaker contacts to their open circuit positions.

It is also well known in the circuit breaker art to trip a breaker upon the occurrence of an instantaneous short circuit condition above a predetermined magnitude. Such operation is usually provided by an electromagnet which, when energized by the short circuit current, actuates an armature associated therewith, which armature is then mechanically interconnected to a latch arrangement for operating the circuit breaker contacts. Preferably, the latch arrangement for the actuation of the circuit breaker contact in response to a short circuit condition is the same latch arrangement which actuates the contact in response to a time-delay overload condition.

The above described prior art circuit breaker arrangements require close calibration and accurate alignment of the various mechanical members interconnected between the electromagnet and the latch arrangement and the bi-metallic element and latch arrangement. Accordingly, variations which result from misalignment and excessive operation adversely affect the calibration and operating characteristics of the circuit breaker.

Furthermore, the mechanical circuit breaker arrangements of the type described interrupt current flow by physical movement of arcing contacts between closed and open circuit positions. The opening of such contacts is complicated by electrical arcing which is produced when the contacts are drawn away from their associated circuit contacts. Such arcing physically deteriorates the respective contacts and furthermore, ionized gaseous byproducts therefrom enhance the undesirable possibility of a re-strike between contacts to reestablish the circuit which was to be interrupted.

In contrast to prior art circuit breakers, the instant invention provides novel solid-state circuitry for sensing both instantaneous short circuit and time-delayed overload conditions and for interrupting a circuit in response thereto. The threshold detection levels for actuating the circuit interrupter may be selectively varied by changing relatively few circuit parameters, with such ease of calibration providing an extremely versatile overload protection circuit which may be interchangeably used with a variety of circuit interrupters for single or multi-phase systems. The invention further contemplates remotely sensing the temperature of the device being protected and interrupting the circuit in response thereto.

Operation of the invention is primarily based on the fact that the sensing of overload currents produces a voltage which can be shaped for any desired time-delay and/or instantaneous response. When such voltage reaches a predetermined value amplication takes place and in response thereto, semi-conductor or mechanical devices are operated to open the circuits being protected. Similarly when the temperature of the load being protected exceeds a predetermined value the semi-conductor or mechanical device is operated to interrupt the circuit.

Essentially the invention comprises a current sensor, a wave-shaping network, an amplifier circuit, a remote sensor, a power supply and a circuit interrupter. The voltage output of the current sensor is modified by the wave-shaping network to produce voltage signals indicative of instantaneous and time-delay current responses and applied to the amplifier circuit which causes operation of the circuit interrupter when the output of the wave-shaping network is of a predetermined threshold magnitude which is dependent upon the instantaneous and time-delay characteristics chosen for the circuit. Similarly when the temperature of the protected load exceeds a predetermined value, such signal is applied to the amplifier which thereby operates the circuit interrupter to interrupt the current.

In a preferred embodiment of this invention, the circuit interrupter comprises a semi-conductor controlled rectifier which is normally conducting but which may be turned off upon short circuit or overload conditions to interrupt the circuit between source and load.

The current sensor consists preferably of a transformer which has an output potential proportional to the load current. The wave-shaping network consists essentially of a potentiometer circuit responsive to the circuit sensor output potential to provide the instantaneous current tripping values, and a time-delayed R-C circuit also responsive to the circuit sensor output potential to provide the time-delay responses.

The amplifier circuit consists of a first normally conducting amplifier, preferably a transistor, which is inductively coupled to the current path between the source and the load being protected and which amplifier maintains the semi-conductor controlled rectifier in its conducting state. A second normally non-conducting amplifier, also preferably a transistor, is responsive to the output of the wave-shaping network and upon reception of a predetermined magnitude of voltage corresponding to either the instantaneous or time-delayed current values, begins conducting to turn off the first normally conducting amplifier and thus turn off the semi-conductor controlled rectifier which causes circuit interruption. In a preferred embodiment the second normally non-conducting amplifier may be a unijunction transistor, the control characteristics of which are ideal for the threshold characteristics necessary.

The remote sensor is preferably a temperature responsive resistor which detects a predetermined change in temperature to turn off the normally conducting first amplifier which turns off the semi-conductor controlled rectifier to interrupt the circuit being protected.

In alternative embodiments the circuit interrupter may take the form of a transistor which can be made to conduct a given maximum amount of current and thus function as a current limiting device in addition to its primary function as a circuit interrupter. Additionally, mechanical contacts responsive to excitation of a tripping relay may be used as the circuit interrupter.

It is apparent that the instant invention provides a solid-state overload protection circuit capable of detecting both time-delay and instantaneous current conditions and interrupting a circuit in response thereto. In various embodiments the use of solid-state interrupting means eliminates the need for mechanical contacts and problems of ionization of gases and re-strike which are inherent therewith.

Accordingly, it is an object of the instant invention to provide a circuit interrupter which comprises first means for interrupting the flow of current between a source and a load, circuit sensor means responsive to such current for producing a voltage proportional to the magnitude of such current, wave-shaping circuitry responsive to such voltage for producing voltage signals representative of both instantaneous and time-delayed values of current, and amplifier circuitry responsive to predetermined magnitudes of such instantaneous and time-delayed values of current for activating the circuit interrupter.

Another object of the instant invention is to provide an overload protection circuit for sensing time-delay and/or instantaneous current responses.

Yet another object of the instant invention is to provide a solid-state overload protection circuit, the time-delay and instantaneous current response of which may be changed by altering a few circuit parameters thereof.

Still another object of the instant invention is to provide a solid-state overload protection circuit which may be used with a variety of current interrupters.

Another object of the instant invention is to provide a solid-state overload protection circuit which may be provided with a remote sensing device which will activate a circuit interrupter in response to a predetermined change in temperature.

Still another object of the instant invention is to provide a solid-state overload protection circuit which eliminates the mechanical circuit breaker arrangements prevalent in the prior art.

Other objects and a fuller understanding of the instant invention may be had by referring to the following description in conjunction with the drawings, in which:

FIGURE 1 is a circuit diagram in block diagram form showing the basic arrangement of the instant invention;

FIGURE 2 is a schematic circuit diagram of the overload protection circuit of FIGURE 1;

FIGURE 3 is a partial schematic circuit diagram illustrating an alternative embodiment of a portion of the circuit shown in FIGURE 2;

FIGURE 5 is a partial schematic diagram of the overload protection circuit shown in FIGURE 4, but showing an alternative embodiment thereof; and FIGURE 6 is another partial schematic diagram of the overload protection circuit shown in FIGURE 4, but showing an alternative embodiment thereof.

Figure 4:
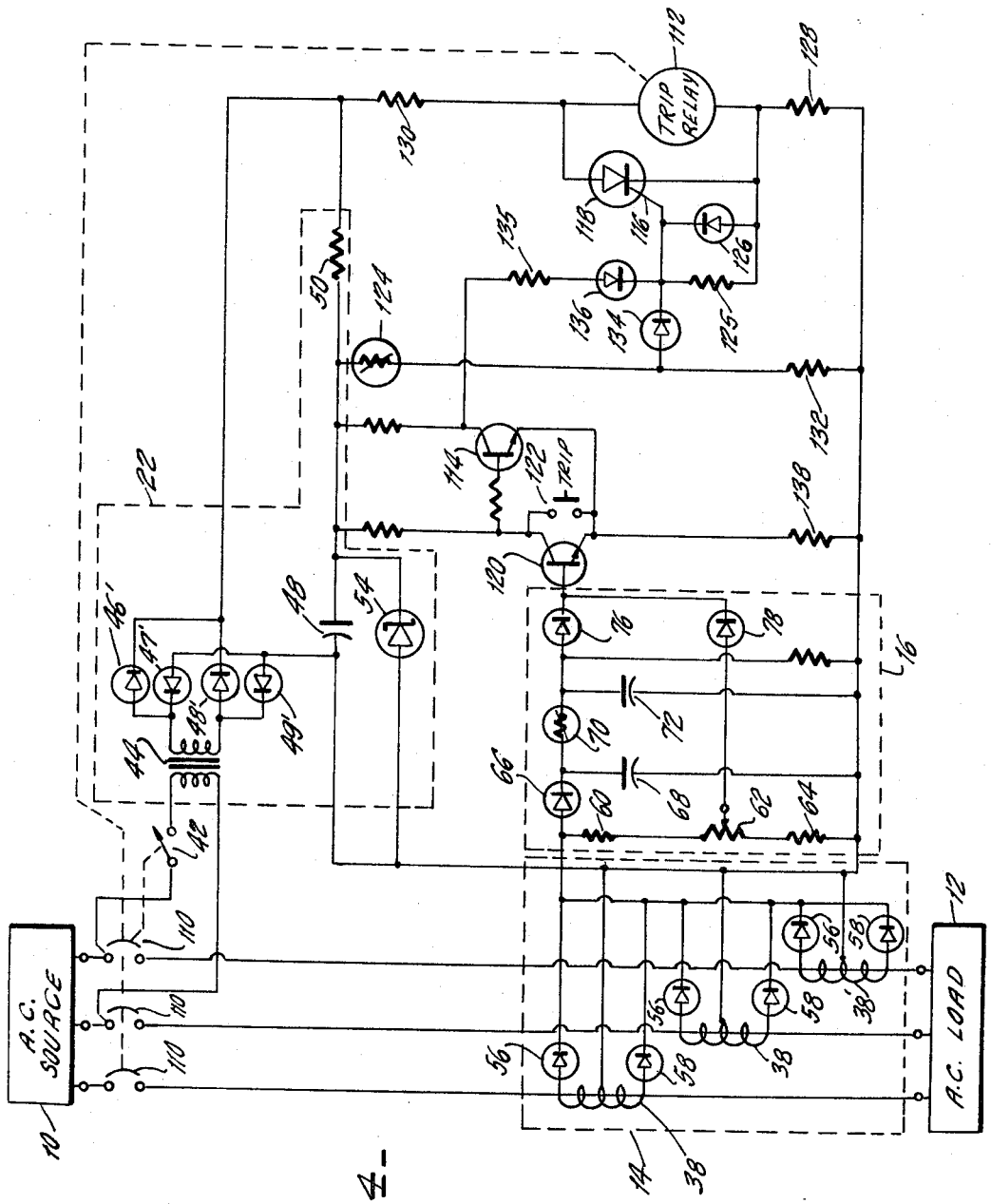
FIGURE 4 is a schematic circuit diagram of an overload protection circuit of the instant invention using mechanical contacts as the circuit interrupter.

Referring to FIGURE 1, there is shown in block diagram form the basic overload protection circuit of the instant invention, providing circuit protection between an AC source 10 and AC load 12. The protection circuit consists of a current sensor 14, a wave-shaping network 16, amplifier circuit 18, remote sensor 20, a power supply 22 and a circuit interrupter 24. When current is flowing from source 10 to the load 12, the voltage output of the current sensor 14 passes through the wave-shaping network 16 to the amplifier 18. When the output of the wave-shaping network 16 is of the proper magnitude, depending upon the instantaneous and/or time-delayed current responses desired, the amplifier, which derives its power from power supply source 22, then operates the circuit interruptor 24 to interrupt the current path between source 10 and load 12. Similarly when the temperature of the load exceeds a predetermined value, the signal from the remote sensor 20 is amplified by amplifier circuit 18 which in turn operates circuit interruptor 24 to interrupt the current path between the source and load.

Referring to FIGURE 2, there is shown a schematic circuit diagram of a preferred embodiment of the overload protection circuit of FIGURE 1. The basic block enclosed elements 10, 12, 14, 16, 18, 20, 22 and 24 correspond to the block diagram of FIGURE 1 and have the functions which were described with respect to the figure.

The circuit interrupter 24 is seen to comprise a semi-conductor controlled rectifier 26 along with associated diodes 28, 30, 32 and 35. Semi-conductor controlled rectifier 26 will only conduct if there exists a positive voltage on its anode with respect to its cathode and if there exists a positive voltage on its gate 34 with respect to its cathode. Removal of the positive gate signal will cause the semi-conductor controlled rectifier 26 to stop conducting when the current goes through the next zero.

To determine the flow of current from the source 10 to the load 12, assume that the disconnect switch 31 is closed and that there is a positive voltage on the gate 34 with respect to the cathode of the semi-conductor controlled rectifier 26. With terminal 36 positive, the current flows from terminal 36 through disconnect switch 31, diode 30, semi-conductor controlled rectifier 26, diode 32, current sensor 14, which includes transformer 38, AC load 12, and disconnect switch 31 to the terminal 40 of the AC source 10.

With terminal 40 positive, the current flows from terminal 40 through disconnect switch 31, AC load 12, transformer 38 of current sensor 14, diode 35, semi-conductor controlled rectifier 26, diode 28, and disconnect switch 31 to terminal 36 of AC source 10. Thus a positive voltage is always supplied to the anode of semi-conductor controlled rectifier 26 with respect to its cathode, and therefore a positive signal at gate 34 is all that is necessary to make semi-conductor controlled rectifier 26 conduct.

The power supply 22 consists of switch 42, transformer 44, diode 46, capacitor 48, resistor 50, capacitor 52, and Zener diode 54. The reset switch 42 remains in the normally closed position (indicated as N.C.) so that when the semi-conductor controlled rectifier 26 is turned off, the power supply 22 is also turned off. Thus the semi-conductor controlled rectifier 26 is prevented from being turned on until the reset switch 42 has been momentarily depressed to its normally open position.

The output of transformer 44 is rectified by diode 46 and filtered by the R-C circuit including capacitors 48, 52 and resistor 50. Zener diode 54 maintains a constant voltage for the circuit within predetermined design limits.

The circuit sensor 14 comprises transformer 38 and diodes 56 and 58. The output potential of transformer 38 is proportional to the current flowing between source 10 and load 12. Diodes 56 and 58 rectify this output potential into a pulsating potential which is then impressed upon the wave-shaping network 16, to be presently described.

The wave-shaping network 16 consists of resistor 60, potentiometer 62, resistor 64, diode 66, capacitor 68, voltage variable resistor 70, capacitor 72, resistor 74 and diodes 76 and 78. The current flowing through the circuit comprising resistor 60, potentiometer 62, and resistor 64 is directly proportional to the voltage developed at the output of current sensor 14 and provides the instantaneous current tripping value which may be easily varied according to the required trip specifications by selectively setting the potentiometer 62 so that a desired proportion of the total potential appearing at the output of current sensor 14 will be impressed upon diode 78.

Diode 66, capacitor 68, voltage variable resistor 70, capacitor 72 and resistor 74 constitute an R-C circuit which provides the desired time-delay responses corresponding to moderate overload conditions. The pulsating potential from current sensor 14 charges capacitor 68 through diode 66. The voltage across capacitor 68 then charges capacitor 72 through voltage variable resistor 70. The combination of the parameters of the two capacitors 68 and 72 and the voltage variable resistors 70 determine the time-delay of the circuit which may be selectively varied by simply changing the circuit parameters. Diodes 76 and 78 constitute a voltage selective circuit which operates to provide the highest voltage from either the instantaneous circuit or the time-delay circuit to the amplifier circuit 18 which is to be presently described.

Amplifier circuit 18 consists preferably of transistor 80, resistors 82, 84 and 86, transistor 88, and resistor 90. When the power supply 22 is first turned on, by momentarily depressing the reset switch 42, transistor 88 conducts because of the current path established through resistors 84 and 86, the base emitter junction of transistor 88, and resistor 82. Assuming that neither the voltage appearing across potentiometer 62 (which corresponds to the instantaneous current tripping value) nor the potential appearing across the R-C circuit comprising capacitors 68 and 72, and variable voltage resistor 70 (which corresponds to the time-delayed current tripping value) has reached their preselected values for circuit interruption, it is apparent that transistor 80 will not conduct since there will be no current flowing across its base-emitter junction. With transistor 88 conducting, there is a voltage drop across resistor 90, and as a result the gate 34 of semi-conductor controlled rectifier 26 is made positive with respect to its cathode through resistor 96 which limits the current to the gate 34. Diode 98 and resistor 100 operate to give semi-conductor controlled rectifier 26 proper bias.

Since the anode of semi-conductor controlled rectifier 26 is always positive with respect to its cathode (this fact is assured because of the diode network 28, 30, 32 and 35 described previously) and the gate 34 of semi-conductor controlled rectifier 26 is positive with respect to its cathode (because of the continuous conduction through transistor 88), the current path from AC source 10 to load 12 is maintained.

As mentioned previously, when the voltage appearing at the base of transistor 80 reaches a preselected threshold value corresponding to the preselected values chosen for instantaneous and time-delayed circuit responses, transistor 80 begins to conduct and causes circuit interruption in a manner to be presently described. While transistor 88 is conducting there exists a voltage drop across resistor 82. As long as the voltage at the base of transistor 80 is less than this voltage drop, transistor 80 will not conduct and therefore a positive signal will be maintained on gate 34 of rectifier 26 to maintain the current path from source 10 to load 12.

However, as the voltage at the base of transistor 80 proceeds to get higher in value than the voltage drop across resistor 82, transistor 80 will conduct and proceed to turn off transistor 88. As transistor 80 conducts, the voltage drop across resistors 82 and 84 increases. This results in a voltage drop across the base-emitter junction of transistor 88 and the base current is reduced to minimum value and transistor 88 is turned off. The particular voltage which will cause activation of transistor 80 may be selectively varied by proper choice of circuit parameters such as potentiometer 62, voltage variable resistor 70 and resistor 82. It is to be noted that the threshold voltage for transistor 80 might come directly from the instantaneous circuit (potentiometer 62 through diode 78) or from the time-delay circuit (which includes R-C circuit comprising capacitor 68, 72 and variable voltage resistor 70) through diode 76.

With transistor 80 conducting and transistor 88 turned off, the gate 34 of semi-conductor controlled rectifier 26 is made less positive than its cathode and conduction will cease between source 10 and load 12 on the next current zero. When semi-conductor controlled rectifier 26 is turned off, the power supply 22 is turned off also, and the rectifier 26 will remain off until the reset switch 42 is momentarily depressed. (This is assuming that the voltage appearing at the base of transistor 80 has subsequently subsided to a voltage below the threshold level when the power supply 22 is reactivated.)

Trip switch 104 provides a direct current path from resistor 84 to resistor 82 and may be depressed to turn off transistor 88 when it is desired to manually effect circuit interruption.

The remote sensor 20 comprises resistor 94, transistor 92 and a temperature responsive variable resistor 102, the resistance of which rises with increasing temperature. The combination of resistor 94 and the variable resistor 102 provides a voltage dividing network, with the voltage to the base of transistor 92 being dependent upon the ratio of the two resistances of the divider network. As long as the voltage drop across the variable resistor 102 is lower than the voltage drop across resistor 82, transistor 92 will not conduct. However, as the voltage across resistor 102 increases due to a temperature rise, conduction will begin in transistor 92 which will proceed to turn off transistor 88 by establishing a current path from power supply 22 through resistor 84, transistor 92, and resistor 82 which current path will by-pass transistor 88. Once again, when transistor 88 is turned off, the voltage appearing at the gate 34 of rectifier 26 will become less positive than the cathode and such rectifier will cease to conduct to cause circuit interruption between the source 10 and the load 12.

As an alternative embodiment, it is possible to connect the output of variable resistor 102 and resistor 94 to the base of transistor 80 thus eliminating the need for transistor 92. If remote temperature sensing is not required altogether, resistors 94 and 102 may be eliminated.

It is apparent that the above described solid-state overload protection circuit functions to interrupt a current path between a source and associated load in a completely electronic mode of operation which is responsive to both instantaneous short circuit and time-delay overload conditions, the threshold levels of which may be easily varied by changing cricuit parameters. The overload protection circuit of this invention further functions to electronically effectuate circuit interruption in response to a predetermined increase in temperature and thus eliminates the use of a mechanically operable temperature responsive bi-metallic element which is prevalent in the prior art.

Referring to FIGURE 3, there is shown an alternative embodiment for the circuit interrupter 24 shown in FIGURE 2. The circuit interrupter of FIGURE 3 is similar to that of FIGURE 2 and consequently like numerals have been used to identify like elements. The essential difference existing betwen th circuit interrupters of FIGURE 2 and FIGURE 3 is that a transistor 106 is used in place of the semi-conductor controlled rectifier 26. The signal appearing on the gate 108 of transistor 106 is dependent upon the state of transistor 88 shown in FIGURE 2, and if such transistor should be turned off due to conduction through transistor 80 in response to either a potential corresponding to the preselected instantaneous current tripping value or a potential corresponding to the preselected time-delayed tripping value, the signal appearing at gate 108 will be insufficient to maintain conduction through transistor 106 with instantaneous circuit interruption resulting therefrom. By choosing the proper transistor 106 and resistor 96, transistor 106 can be made to conduct only a given maximum amount of current and therefore may additionally function as a current limiting device.

Referring to FIGURE 4, there is shown an alternative embodiment of the instant invention in which relay operated mechanical contacts 110 are used as the circuit interrupter element. The circuit is similar to that shown in FIGURE 2 and consequently like numbers have been used to designate like elements.

The power supply 22 consists of switch 42, transformer 44, diodes 46', 47', 48', 49', capacitor 48, resistor 50 and zener diode 54. Switch 42 is normally closed to maintain trip relay 112 in a normally energized state through diodes 46', 47', 48' and 49'. Thus the contacts 110 are maintained in their closed circuit position to establish a current path from source 10 to load 12.

The output of transformer 44 is rectified by diodes 46', 47', 48' and 49' and filtered by the R-C circuit including capacitor 48 and resistor 50. Zener diode 54 maintains a constant voltage for the circuit within predetermined design limits.

The circuit sensor 14 comprises a plurality of transformers 38, one for each phase of the multiphase system, and a pair of diodes 56, 58 associated with each transformer 38 to rectify their output potentials into pulsating potentials which may then be impressed upon the wave-shaping network 16.

The wave-shaping network 16 produces a first voltage signal proportional to the instantaneous value of the current flowing between load 12 and source 10 through the circuit which includes resistor 60, potentiometer 62 and resistor 64, and a second voltage signal proportional to a time-delayed response of the current flowing between the source and load through the R-C circuit comprising capacitors 68, 72 and variable resistor 70.

As noted previously with respect to FIGURE 2, the voltage necessary to produce the instantaneous current tripping value may be preselected and easily varied by judiciously setting the potentiometer 62 so that a desired portion of the total pulsating potential appearing at the output of current sensor 14 will be impressed upon diode 78. Also, the time-delay characteristics of the R-C circuit may be varied by changing the characteristics of the voltage variable resistor 70.

The amplifier circuitry includes a transistor 114 which is normally conducting when the power supply 22 is on. With transistor 114 conducting the gate 116 of semi-conductor controlled rectifier 118 is less positive than its cathode and thus the rectifier 118 is normally nonconducting. However, when transistor 114 is turned off in response to conduction through transistor 120 caused by voltages in excess of the predetermined instantaneous or time-delayed response, or by depression of trip switch 122, or by means of the remote temperature sensor 124, the gate 116 of rectifier 118 is made more positive than its cathode through resistor 125 and diodes 134 and 136. As a result semi-conductor controlled rectifier 118 conducts, shorting out relay 112 which thereby trips the mechanical contacts 110 to their open circuit position. Contacts 110 operate switch 42 to turn off the power supply 22 when the contacts 110 are fully opened. Resistor 128 is used to bias semi-conductor controlled rectifier 118 while resistor 130 is used to limit the current through rectifier 118 during tripping action.

As mentioned above, transistor 114 may be turned off by actuation of the remote temperature sensor included in the circuit of FIGURE 4. Temperature responsive variable resistor 124 operates in an inverse manner to temperature responsive variable resistor 102 of FIGURE 2. That is, as the temperature of resistor 124 increases, its resistance decreases. Resistor 132 and resistor 124 comprise a voltage divider circuit which decreases the voltage across resistor 124 and increases the voltage across resistor 132 in response to increasing temperature. At the preselected temperature the voltage drop across resistor 132 is sufficient to cause the gate 116 of rectifier 118 to become more positive than its cathode which causes rectifier 118 to conduct, shorting out trip relay 112 to open the contacts 110. Diodes 134 and 136 act as voltage selectors and to allow the more positive voltage (as between the drop across resistor 132 and the drop established across transistor 114 and resistor 138) to be impressed upon the gate 116 of the rectifier 118.

In FIGURE 5 there is shown an alternative embodiment of a portion of the circuit shown in FIGURE 4. The essential difference between the circuits of FIGURE 5 and FIGURE 4 is that in FIGURE 5 the trip relay 112 is located in the collector circuit of transistor 114 and is consequently turned off in direct response to the turning off of transistor 114. Additionally, instead of an increase in temperature on resistor 132 impressing a positive signal on the gate 116 of rectifier 118, as in FIGURE 4, the increased voltage drop of resistor 132 now turns on a transistor 140 which thereby turns off transistor 114 to deenergize trip relay 112.

In FIGURE 6 there is shown an alternative embodiment of a portion of the circuit shown in FIGURE 4. The essential differences between the circuits of FIGURE 6 and FIGURE 4 are (1) that in FIGURE 6, the amplifier circuit includes a unijunction transistor 150 as the threshold device responsive to either instantaneous or time-delayed responses, and (2) the tripping relay 152 is a shunt trip relay which is in series with the semiconductor controlled rectifier 154. Although a unijunction transistor per se forms no part of the instant invention, its characteristics are ideal for the threshold function performed in the environment of the invention.

Specifically, with terminal 158 of diode network 156 positive, current flows through resistors 162, base 164 of unijunction transistor 150 and resistor 166, with the emitter 168 facing a reverse bias established by the potential appearing across the top half of base 164, resistor 162, and resistor 170. Upon reception by emitter 168 an instantaneous or time-delayed voltage (chosen for the responses desired) greater than such reverse bias, unijunction transistor 150 fires; the resistance across the lower portion of base 164 is reduced; and consequently the drop across resistor 166 is increased to cause the gate of semi-conductor controlled rectifier 154 to become more positive than its cathode. Rectifier 154 now conducts and relay 152 opens the mechanical contacts 110 to interrupt the current between source 10 and load 12. For further detail on unijunction transistors reference is made to pages 292 et seq. of Transistors, in Radio, Television, and Electronics by Milton S. Kiver, McGraw-Hill, 1959. It is apparent that the use of a unijunction transistor eliminates the necessity of a normally conducting transistor such as that shown at 88, and 114 in FIGURES 2, 4 and 5.

There has been described a solid-state overload protection circuit and various alternative embodiments thereof which eliminates or materially simplifies the mechanical circuit breaker arrangements provided in the prior art. The instant invention includes electronic sensing means which produces voltages proportional to preselected instantaneous and time-delayed overload current conditions. Calibration of the sensing means may be altered by simply changing circuit parameters and thus many time-delay response curves and instantaneous current tripping values may be achieved to produce an extremely versatile protection circuit which may be used for a single or multiphase electrical system and which may be easily adapted to cooperate with a variety of circuit interrupting elements which may include semi-conductor controlled rectifiers, transistors or mechanical contacts. The instant invention additionally includes a remote sensing device which can interrupt a circuit in response to a predetermined change in temperature and furthermore such remote sensing device may be introduced at various points in the overload protection circuit or eliminated altogether if unnecessary in a particular application.

Although there has been described a perferred em-

What is claimed is:

1. A circuit interrupter comprising:
first means for interrupting the flow of current between a source and a load;
second means responsive to said current for producing a voltage proportional to the magnitude of said current;
third means responsive to said voltage for producing a first voltage signal representative of the instantaneous value of said current;
fourth means responsive to said voltage for producing a second voltage signal representative of a time-delayed value of said current; and
fifth means responsive to a predetermined magnitude of said first or second voltage signal for activating said first means;
said third means comprises voltage tap means for impressing a portion of said voltage upon said fifth means;
said fourth means comprises at least one electrical element which delays the time at which said fifth means becomes responsive to said second voltage signal;
said electrical element is a capacitor connected in electrical parallel with an electrical circuit joining said second means for said fifth means, said electrical circuit including at least one voltage variable resistor.

2. A circuit interrupter comprising:
first means for interrupting the flow of current between a source and a load;
second means responsive to said current for producing a voltage proportional to the magnitude of said current;
third means responsive to said voltage for producing a first voltage signal representative of the instantaneous value of said current;
fourth means responsive to said voltage for producing a second voltage signal representative of a time-delayed value of said current; and
fifth means responsive to a predetermined magnitude of said first or second voltage signal for activating said first means,
said fifth means comprising a first normally nonconducting amplifier;
said first means being a solid state electronic component which is conducting when said first amplifier is nonconducting and which is nonconducting when said first amplifier means is conducting;
a second normally conducting amplifier responsive to said current for maintaining said electronic component in its conducting state, actuation of said first amplifier in response to said predetermined magnitude of said first or second voltage signal preventing conduction through said second amplifier which thereby prevents conduction through said electronic component to interrupt said current.

3. The circuit interrupter of claim 2, wherein interruption of said current prevents conduction through said second amplifier.

4. The circuit interrupter of claim 2, and further including sixth means responsive to a predetermined change in temperature for preventing conduction through said second amplifier which thereby prevents conduction through said electronic component to interrupt said current.

5. A circuit interrupter comprising:
first means for interrupting the flow of current between a source and a load;
second means responsive to said current for producing a voltage proportional to the magnitude of said current;
third means responsive to said voltage for producing a first voltage signal representative of the instantaneous value of said current;
fourth means responsive to said voltage for producing a second voltage signal representative of a time-delayed value of said current; and
fifth means responsive to a predetermined magnitude of said first or second voltage signal for activating said first means,
sixth means responsive to a predetermined change in temperature for causing said first means to interrupt said current.

6. A circuit interrupter comprising:
a solid-state electronic element operable between a conducting and nonconducting state within a current path connecting an electrical source to an associated load;
a first normally conducting amplifier responsive to the current flowing in said current path for maintaining siad electronic element in its conducting state;
current responsive means coupled to said current path for producing a voltage proportional to the current flowing in said current path;
electronic circuit means responsive to said voltage for producing a first and second voltage signal, said first voltage signal representing the instantaneous value of the current flowing in said current path, said second voltage signal representing a time-delayed value of the current flowing in said current path;
a second normally nonconducting amplifier responsive to said first and second voltage signals for preventing conduction through said first amplifier upon reception of a predetermined value of either said first or second voltage signal;
reception of said predetermined value of either of said first or second voltage signals by said second amplifier preventing conduction through said first amplifier means which thereby causes said electronic element to change to its nonconducting state and interrupt the flow of current through said current path.

7. The circuit interrupter of claim 6, and further including a temperature sensitive element for preventing conduction through said first amplifier means upon detection of a predetermined change in temperature.

8. The circuit interrupter of claim 6, wherein said electronic circuit means comprises:
a voltage potentiometer connected in electrical series between said current responsive means and said second amplifier; and
a time-delay circuit connected in electrical parallel with said voltage potentiometer, said time-delay circuit including at least one resistor and one capacitor in electrical parallel with said resistor.

9. A circuit interrupter comprising:
a semi-conductor controlled rectifier operable between a conducting and nonconducting state within a current path connecting an electrical source to an associated load;
a first transistor inductively coupled to said current path and electrically connected to and controlling the state of said rectifier, current flow through said current path maintaining said first transistor in a conducting state thereby maintaining said rectifier in its conducting state;
a transformer inductively coupled to said current path for producing a voltage proportional to the current flowing in said current path;
electronic circuit means responsive to said voltage for producing a first and second voltage signal, said first voltage signal representing the instantaneous value of the current flowing in said current path, said second voltage signal representing a time-delayed value of the current flowing in said current path, said electronic circuit means including a voltage potentiometer electrically connected to said transformer for producing said first voltage signal and a time-delay circuit connected in electrical parallel with said potentiometer for producing said second voltage signal, said time-delay circuit including at least one resistor and at least one capacitor in electrical parallel with said resistor;

a second transistor electrically responsive to said first and second voltage signals and operatively connected to said first amplifier, reception of a predetermined magnitude of said first or second voltage signal by said second transistor preventing conduction through said first transistor which thereby switches said rectifier to its nonconducting state to interrupt the flow of current through said current path; and a temperature variable element operatively connected to said first transistor, detection of a predetermined change in temperature by said temperature variable element causing said first transistor to become nonconducting to thereby switch said rectifier to its nonconducting state to interrupt the flow of current through said current path.

10. The circuit interrupter of claim 6, wherein said electronic element is a transistor, the characteristics of which may be selectively chosen to allow only a predetermined maximum amount of current to pass therethrough.

11. A circuit interrupter comprising:
a mechanical contact operable between an open circuit and closed circuit position within a current path connecting an electrical source and an associated load;
relay means connected to said contact and electrically coupled to said current path, said relay means maintaining said contact in its closed circuit position only when current flows therethrough;
a solid-state electronic element operable between a conducting and nonconducting state, said element preventing current flow through said relay means when said element is in its conducting state;
first normally conducting amplifier means responsive to the current flowing in said current path for maintaining said electronic element in its nonconducting state;
current responsive means coupled to said current path for producing a voltage proportional to the current flowing in said current path;
electronic circuit means responsive to said voltage for producing a first and second voltage signal, said first voltage signal representing the instantaneous value of the current flowing in said current path, said second voltage signal representing a time-delayed value of the current flowing in said current path;
second normally nonconducting amplifier means responsive to said first and second voltage signals for preventing conduction through said first amplifier means upon reception of a predetermined value of either of said first or second voltage signals;
reception of said predetermined value of either of said first or second voltage signals by said second amplifier means preventing conduction through said first amplifier means which thereby causes conduction through said electronic element to thereby prevent current flow through said relay means and actuate said contact to its open circuit position.

12. The circuit interrupter of claim 11, wherein said solid-state electronic element is a semi-conductor controlled rectifier.

13. The circuit interrupter of claim 11, wherein said solid-state electronic element is a transistor.

14. The circuit interrupter of claim 11, and further including a temperature sensitive element for preventing conduction through said first amplifier upon detection of a predetermined change in temperature.

15. A circuit interrupter comprising:
a mechanical contact operable between an open circuit and closed circuit position within a current path connecting an electrical source and an associated load;
relay means connected to said contact, said relay means moving said contact to its open circuit position upon energization thereof;
a solid-state electronic element operable between a nonconducting and conducting state, said element preventing energization of said relay means when said element is in its nonconducting state;
current responsive means coupled to said current path for producing a voltage proportional to the current flowing in said current path;
electronic circuit means responsive to said voltage for producing a first and second voltage signal, said first voltage signal representing the instantaneous value of the current flowing in said current path, said second voltage signal representing a time-delayed value of the current flowing in said current path;
a unijunction transistor having a base responsive to current flow between said source and said load, and an emitter responsive to a predetermined magnitude of said first or second voltage signal for changing said solid-state electronic element to its conducting state upon reception of said predetermined magnitude;
reception of said predetermined magnitude of either of said first or second voltage signals by said emitter causing conduction through said electronic element which thereby energizes said relay means to move said contact to its open circuit position.

16. A circuit interrupter comprising:
first means for interrupting the flow of current in a current path between a source and a load; said first means including a solid state electronic element in said current path and operable between a conducting and nonconducting state within said current path;
second means responsive to said current for producing a voltage proportional to the magnitude of said current;
third means responsive to said voltage for producing a first voltage signal proportional to the instantaneous value of said current and representative of said instantaneous value;
fourth means responsive to said voltage for producing a second voltage signal proportional to a time delayed value of said current and representative of said time delayed value; and
fifth means for continuously monitoring both said first and second voltage signals and responsive to a predetermined magnitude of either of said first or second signal for activating said first means by causing said electronic element to be transferred from its conducting state to its nonconducting state.

17. The circuit interrupter of claim 16 wherein said fifth means comprises a first normally nonconducting amplifier which becomes conducting only upon reception of said predetermined magnitude of said first or second voltage signal.

References Cited
UNITED STATES PATENTS

| | | | |
|---|---|---|---|
| 3,255,384 | 6/1966 | Riebs | 317—33 X |
| 3,319,127 | 5/1967 | Zocholl et al. | 317—36 |
| 3,327,171 | 6/1967 | Lipnitz et al. | 317—36 |
| 3,329,870 | 7/1967 | De Viney et al. | 317—36 |

LEE T. HIX, *Primary Examiner.*

R. V. LUPO, *Assistant Examiner.*

PO-1050
(5/69)

UNITED STATES PATENT OFFICE
CERTIFICATE OF CORRECTION

Patent No. 3,398,325     Issued 20 August 1968

Entitled: SOLID STATE OVERLOAD PROTECTION CIRCUIT

Inventor(s) H. R. Shaffer

It is certified that error appears in the above-identified patent and that said Letters Patent are hereby corrected as shown below:

Column 11, line 11 - delete "amplifier" and replace with ---transistor---.

SIGNED AND
SEALED

NOV 18 1969

(SEAL)
Attest:

Edward M. Fletcher, Jr.
Attesting Officer

WILLIAM E. SCHUYLER, JR.
Commissioner of Patents